Aug. 31, 1943.   G. CARLSON ET AL   2,328,421
BOX SUPPORTING DEVICE
Filed Aug. 26, 1941

Inventors:
George Carlson,
Edward B Clark
by Harry E. Dunham
Their Attorney.

Patented Aug. 31, 1943

2,328,421

UNITED STATES PATENT OFFICE 2,328,421

BOX SUPPORTING DEVICE

George Carlson, Trumbull, and Edward B. Clark, Milford, Conn., assignors to General Electric Company, a corporation of New York Application August 26, 1941, Serial No. 408,310

3 Claims. (Cl. 248—300)

Our invention relates to box supporting devices and more particularly to a mounting bracket for electrical outlet boxes, or the like, of the type utilized in wiring systems for buildings.

In wiring buildings, it is customary to employ outlet boxes at points where the branch circuits are joined and likewise at points where it is desired to mount a wiring device, such as a switch or convenience outlet, to connect it into the circuit. Such boxes are mounted at any chosen convenient place in the wall of the building and are usually fastened to one of the studs forming part of the framework of the wall. In the case of new buildings, the boxes are frequently mounted in a position so that the front of the box extends outwardly from the face of the stud a distance corresponding to the thickness of the plaster or other finishing material. This means that when the wall is finished, the front of the box is disposed in position flush with the outer surface of the wall. A considerable saving of time and expense in mounting such switch boxes could be effected if the box were provided with a mounting bracket designed to positively locate the box in proper position without the necessity of measurements. It is to this purpose that our invention is directed.

On the other hand, in certain installations, it may be desirable to mount the outlet box in position flush with the wall of the building or other support on which the box is to be mounted. In such cases, the mounting bracket must be so designed that it may be readily adapted for use in mounting the box in position flush with the wall. To this end, our box supporting device is so constructed that it may be used to mount the outlet box either flush with the face of the support or in a position to accommodate the finishing coat of the wall.

The object of our invention is to provide a new and improved box supporting device or bracket so constructed and arranged that the box may be easily mounted in various positions depending upon its relation to the wall surface.

In the accompanying drawing, Fig. 1 is a perspective view of an outlet box provided with our supporting device showing the manner in which the box is mounted in position to cooperate with a finishing coat of the wall; Fig. 2 is a perspective view of the box supporting device; Fig. 3 is another perspective view of a box provided with our supporting device in which the device has been so adjusted that the box is mounted flush with the wall; Fig. 4 is a perspective view of the device adjusted for mounting the box flush with the wall; and Fig. 5 is a view showing one way of manufacturing the supporting bracket.

Referring to the drawing, we have shown an electric outlet box 10 provided with a supporting device or mounting bracket 11 for fastening the box to a support 12 which may be a stud forming part of the framework of a wall. Electrical outlet boxes of the type illustrated are customarily provided with a plurality of knockouts 13 in their side walls which are removed at an appropriate point to provide an opening into the interior of the box for receiving the wires to be connected to the wiring device. Inwardly extending ears 14 are formed on opposite walls of the box for supporting such wiring device, for example, a switch or convenience outlet. The bottom of the box is provided with a plurality of openings 15 through which fastening means may be driven if it is desired to mount the box upon a flat surface. Alternatively, the box may be mounted on a support by means of the bracket 11 and it is to this supporting feature that our invention relates.

The supporting device or bracket 11 comprises a strap 16 of relatively rigid sheet metal fastened to one side of the outlet box in any suitable manner, as by protection welding. Opposite ends of the strap extend outwardly beyond the end walls of the box to form arms 17. Each arm is provided with one or more openings 18 which are adapted to receive fastening means, such as nails or screws. The arms 17 are offset laterally from the central portion of the strap fastened to the box by the inclined portions 19. Projecting outwardly from the central portion of the strap at right angles to the arms 17 is a tongue 20 provided with an opening 21 for receiving a suitable fastener. At the point where the tongue is bent outwardly from the central portion of the strap the metal is scored, as indicated at 22, so that the tongue may be broken off and removed for a purpose to be described later.

Fig. 1 illustrates one manner in which our mounting device may be utilized to fasten the outlet box to a support. In the illustration, the support 12 constitutes a stud forming part of the framework of a wall and the box is to be mounted in position so that the front of the box will be in alignment flush with the surface of the finish coat of plaster. In such a case, it is simply necessary to position the mounting bracket so that the arms 17 and tongue 20 engage adjacent walls of the stud and then fasten the bracket in position by nailing it to the stud through the openings 18 and 21. The bracket is fastened to the side of the outlet box in a position such that when the bracket is laid up against the stud in the manner described, the front face of the box will extend outwardly beyond the face of the stud a distance corresponding to the conventional thickness of the finish coat consisting of lath and plaster, for example, a distance of approximately one inch, so that the face of the outlet box is automatically located in correct position. The space between the arms 17 and the side wall of the box formed by the inclined portions 19, forms a means of keying in the plaster adjacent the box. Our mounting bracket provides a means for mounting the outlet box in correct position without the necessity of measuring the point at which it should be mounted to accommodate a finishing coat. This effects a considerable saving of time in installation. Moreover, it prevents incorrect positioning of the box with consequent irregularities in the plaster finish. The box is fastened to the stud in a much stronger manner than usual inasmuch as the tongue and arms provide fastening means on two faces of the support.

While our mounting bracket is particularly designed for use in installations wherein the box is to be mounted flush with the finish coat on the wall, it is adapted equally as well for installation of the box flush with the outer surface of a wall or support. This is the arrangement illustrated by Fig. 3. In such cases, the tongue 20 is removed by breaking it off along the scored joint 22 so that the arms 17 may be fastened to the side of the stud at any desired point. The tongue may also be removed in those cases where the box is used with wall board or plaster thicker than usual; when the tongue is removed the box can be positioned at any point relative to the face of the support.

Another advantage of our mounting bracket is that it may be manufactured from strip metal stock without the formation of scrap. As shown by Fig. 5, a strip of metal 23 may be fed to a punch press and cut off along the dotted lines 23' to form a blank. The tongue 20 of the bracket is formed in the blank by the surfaces 24 which extend toward each other in the form of a V. The tongue in one blank is cut out of the preceding blank so that a recess 25 is left in the strap as finally formed. This facilitates bending of the blank to final form. At the same time that the blanks are cut off of the strip stock, they are punched to form the openings 18 and 21 and the scored portions 22 are formed; likewise, projections 26 are formed at this time to facilitate welding the strap to the outlet box. After the blank has been cut and formed in the manner described, it is put in a press and bent to final shape with the tongue 20 extending at right angles to the arms 17. If desired, the metal joint at the scored portions 22 may be further weakened to facilitate removal of the tongue by the provision of holes 27.

In this manner, the tongue 20 is given a substantial width forming, in effect, a plate. This has the advantage that it lies flat against the support over a comparatively large area so that the box is always positioned parallel to the face of the support and not tipped at an angle. Accurate positioning of the box is further attained by disposing the tongue approximately midway between the arms 17 and between the ends of the box; if the tongue were to be formed adjacent the end of one of the arms 17, there would then be a tendency for the other arm and other end of the box to be tipped out of a plane parallel to the support.

Thus, with our invention we have accomplished an improved means for supporting an electric wiring fixture comprising a box with a side wall and a bracket attached thereto. The bracket is made from a flat strip of metal by a punching and forming operation. It has two intermediate spaced portions 16 for attachment to an object to be supported, which portions are located in a plane and connected by a central portion or tongue 20 located in a plane perpendicular to the plane of the intermediate portions or, from still another angle, the central part of the bracket broadly constitutes a V-shaped strip member with the tip portion of the V bent perpendicular to the legs of the V. The outer portions or arms form extensions of the intermediate portions or legs, each arm being laterally offset from the end of a leg and the two arms being aligned and located in a plane laterally spaced from the legs or intermediate portions 16.

Our construction provides a mounting bracket by which an outlet box may be quickly and easily fastened on a support in position to accommodate the finishing wall coating, such as plaster, without the necessity of determining the location by trial or by measurements. The construction is rigid and is one which will securely hold the box in position. Since the bracket may be formed of sheet material in a punch press, it may be manufactured at low cost.

What we claim as new and desire to secure by Letters Patent of the United States is:

1. A bracket made from a metal strip by a punching and forming operation comprising a central portion essentially V-shaped with the pointed portion of the V bent forward to extend substantially at a right angle to the legs of the V; and two aligned arms each forming a continuation of a leg and having a major portion laterally spaced from the plane of the legs.

2. Means for supporting an electric wiring fixture having a box with a side wall, said means comprising a bracket made from a single strip of metal by a punching and forming operation and comprising a V-shaped strip portion with the tip portion of the V substantially perpendicular to the legs of the V and the legs of the V adapted to be secured to the side wall of the box, and two arms each forming a continuation of a leg of the V and being laterally offset therefrom; the tip of the V and the arms being adapted to be secured to a building structure.

3. Supporting arrangement for an electric wiring fixture comprising a bracket having two spaced intermediate portions in a plane adapted to be secured to the side wall of an outlet box, a tongue substantially perpendicular to said plane uniting the intermediate portions, and two arms each being laterally offset from and united with an intermediate portion; said tongue and arms being adapted to be secured to a building structure.

GEORGE CARLSON.
EDWARD B. CLARK.